United States Patent [19]

Johnson

[11] Patent Number: 4,980,187

[45] Date of Patent: Dec. 25, 1990

[54] METHOD FOR PREPARING BATCH-TYPE POTATO CHIPS

[75] Inventor: Norman B. Johnson, Germantown, Ohio

[73] Assignee: Mike-Sell's Potato Chip Co., Dayton, Ohio

[21] Appl. No.: 900,933

[22] Filed: Aug. 27, 1986

[51] Int. Cl.$^5$ .............................................. A23L 1/217
[52] U.S. Cl. ...................................... 426/438; 426/637
[58] Field of Search ................................ 426/438, 637

[56] References Cited

U.S. PATENT DOCUMENTS

| 2,836,496 | 5/1958 | Salvo | 426/438 |
| 3,484,252 | 12/1969 | Popeil | 426/438 |
| 4,020,189 | 4/1977 | Wright et al. | 426/438 |
| 4,503,127 | 3/1985 | Fan et al. | 426/438 |
| 4,741,912 | 5/1988 | Katz et al. | 426/438 |

Primary Examiner—Arthur L. Corbin
Attorney, Agent, or Firm—Biebel, French & Nauman

[57] ABSTRACT

Potato chips having a flavor, texture and appearance similar to batch cooked chips and decreased oil content are prepared on a continuous basis by depositing freshly sliced potato slices enveloped in natural starches released during the slicing process in a precooking sluice where they are conveyed in a continuous stream of heated precooking oil which caramelizes the natural starch envelope prior to the precooked slices being deposited in a second continuous stream of cooking oil heated to a higher temperature where the final cooking of the potato chips takes place.

14 Claims, 2 Drawing Sheets

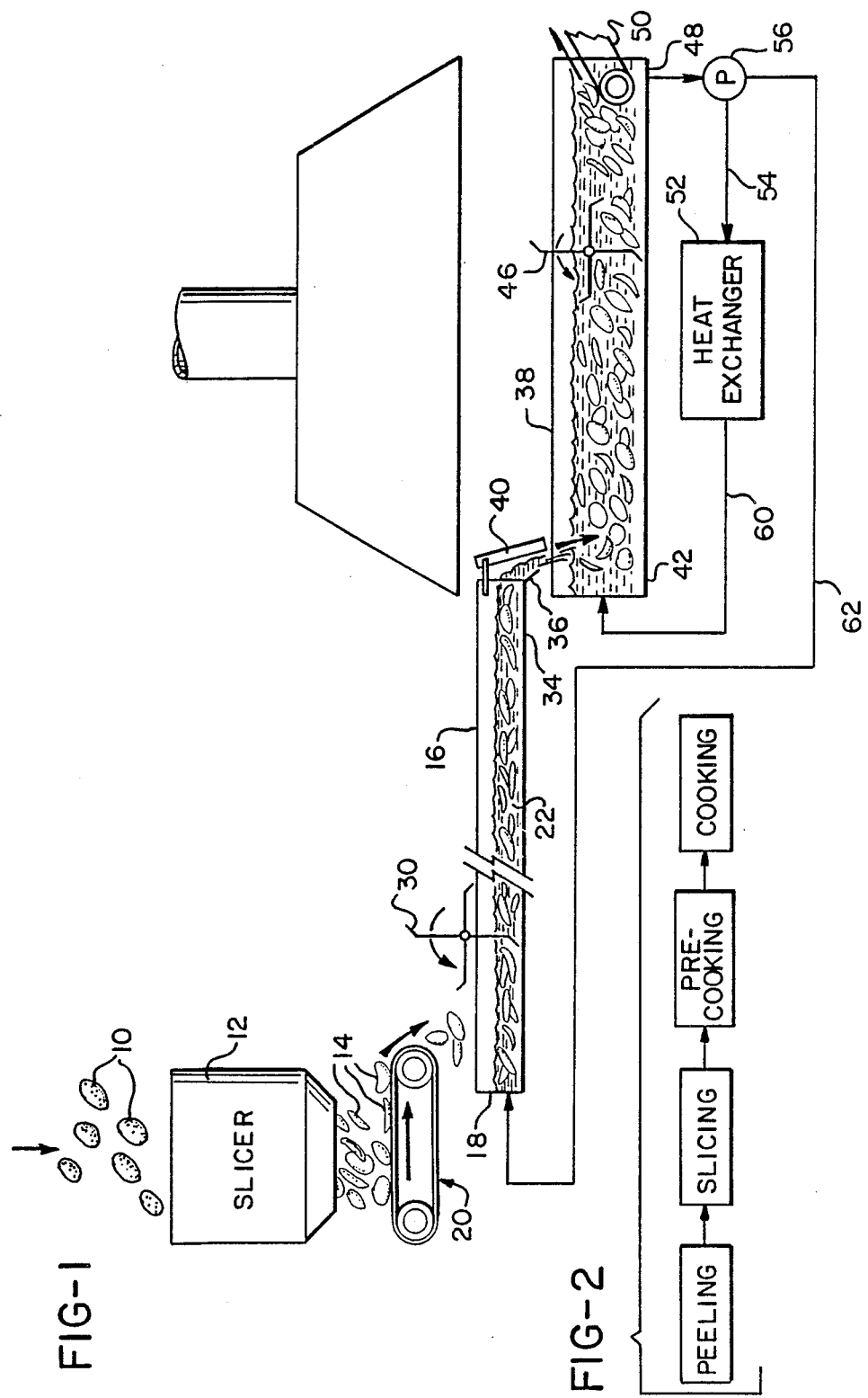

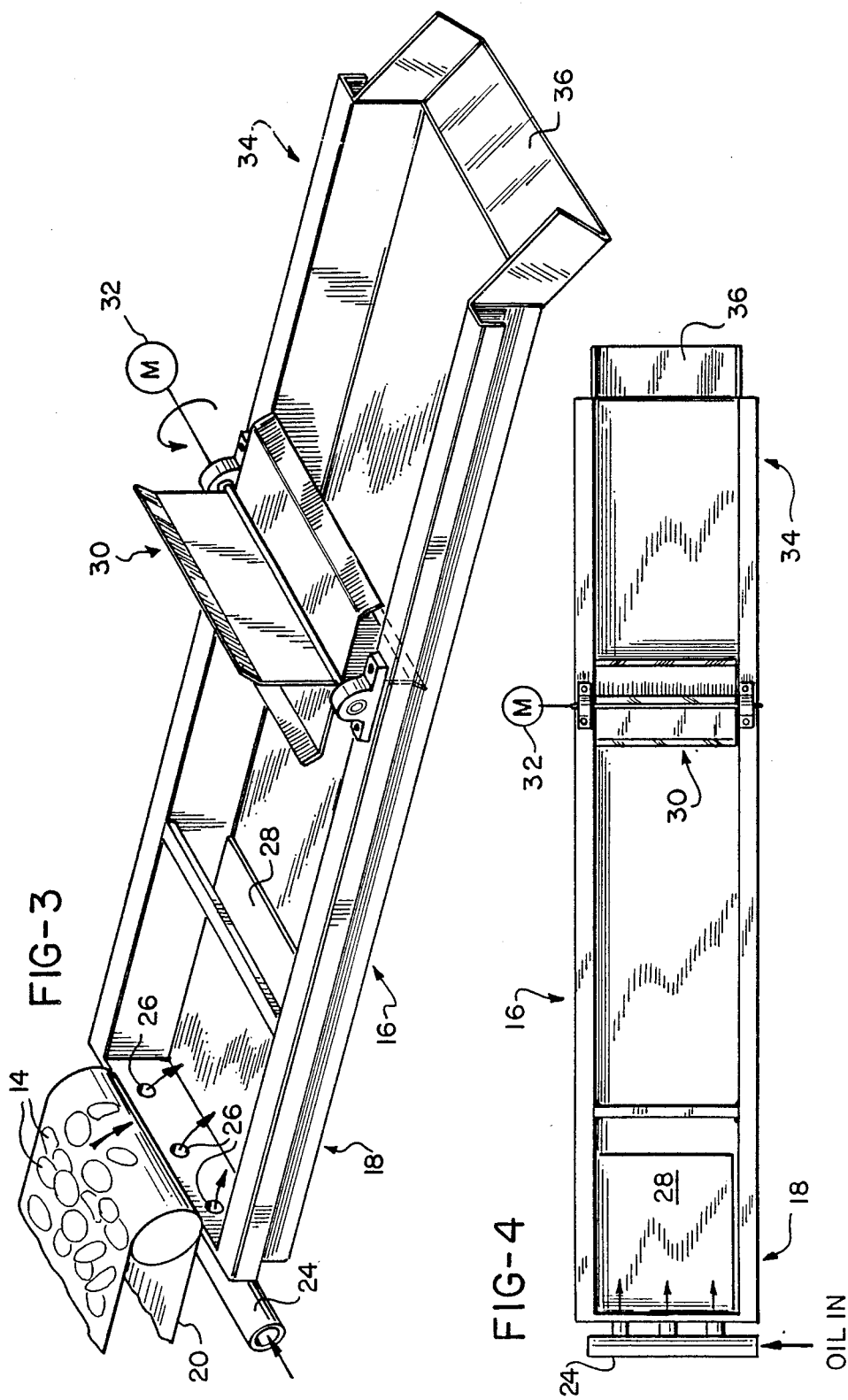

METHOD FOR PREPARING BATCH-TYPE POTATO CHIPS

BACKGROUND OF THE INVENTION

Potato chips were originally prepared on a batch basis with the hand cut potato slices immersed in a kettle of hot cooking oil and cooked until they achieved a desired appearance, at which time the chips were removed from the cooking oil and allowed to drain.

With the increased popularity of potato chips and the commensurate increase in demand for this product, processes and equipment were developed to prepare potato chips on a continuous basis and thereby increase production volumes.

Demand for potato chips continues to increase and is met for the most part by chips prepared on a continuous basis. However, there has also, more recently, been an increased demand for so-called "kettle cooked" chips which have the appearance and flavor of chips cooked by the old-fashioned batch process.

Obviously, the same problem exists today with respect to batch-prepared potato chips that existed with the original introduction of potato chips, i.e., batch production is slow, which results in both an increased price for the batch-prepared product and insufficient volume to meet demand.

It should be noted that in the production of potato chips on a continuous basis using more or less conventional equipment and processes, raw potatoes are first peeled and then sliced and the resulting slices washed, usually with water, to remove the starch which is released during the cutting process and coats the potato slices, and the washed slices are then dropped in a fryer containing a continuous stream of heated cooking oil at a temperature of approximately 325° to 375° F.

In the ensuing cooking process moisture is released from the slices and replaced to some extent by the cooking oil, so that the final product will have an oil content of approximately 35% to 45% by weight and a moisture content of approximately 1.5% to 2.2% by weight.

U. S. Pat. No. 4,503,127 discloses a method of preparing potato chips which eliminates the step of washing the starch-coated potato slices, and instead conveys the unwashed slices into a bath of oil or water having a temperature below the gelatinization temperature of the starch on the slices, e.g., between 122° to 140° F., then cooling the thus treated potato slices to at least 104° F. and preferably 90° F., and thereafter frying the cooled slices in vegetable oil at a temperature of 365° F. The product prepared in this manner is said to be uniform in texture and appearance, less oily and contain more food solids than similar products prepared by traditional methods.

The Background of the Invention section of U.S. Pat. No. 4,503,127 also discusses several prior art patents, namely, U. S. Pat. Nos. 2,091,675; 2,179,035; 2,611,705; 3,223,024; 3,402,059; 3,997,678; 4,068,572; 4,251,895; 4,272,554; 4,277,510; 4,283,425; 4,283,437; 4,392,420; and Re. 27,531, the disclosures of which are incorporated herein by reference.

However, none of the above-noted patents are concerned with the preparation of kettle cooked chips, let alone preparation of chips of this type on a continuous basis.

SUMMARY OF THE INVENTION

In accordance with the present invention a method and apparatus are provided for producing on a continuous, high volume basis potato chips having an appearance, texture and flavor heretofore found in chips prepared on a batch basis.

This is achieved by introducing unwashed potato slices which are enveloped in a natural starch coating released during the slicing process into a sluice containing a continuous stream of cooking oil heated to a temperature of approximately 200° to 300° F., and preferably in a range of 260° to 290° F. for approximately ten to twenty seconds, and preferably from twelve to eighteen seconds, and thereafter frying the precooked slices in a fryer containing a continuous stream of cooking oil at a temperature of approximately 300° to 400° F., and preferably in the range of 305° to 312° F. for approximately five to ten minutes, and preferably from approximately five to seven minutes.

In this manner the layer of natural starch enveloping the freshly sliced potatoes is caramelized in the precooking sluice to form a barrier which resists the penetration of cooking oil in the subsequent frying step to provide a potato chip having a lower oil content, approximately 28% to 35% by weight, than chips cooked in a conventional manner, e.g. 35% to 45% by weight.

Additionally, the caramelized starch coating on the slices tends to retard the rate at which moisture leaves the slice, so that as the moisture escapes it tends to puff the potato slices, resulting in an uneven, more textured appearance with small air pockets under the surface of the chip, which imparts a lightness and crisper, crunchier quality to the chip.

Despite the fact that the caramelized starch coating appears to retard the rate at which moisture escapes from the potato slices, the final moisture content is substantially the same as potato chips cooked in a conventional manner, i.e., 1.5% to 2.2% by weight.

Apparatus for practicing the process of the present invention can be provided at relatively modest cost through the modification of an existing fryer used in a conventional manner for the continuous production of conventional potato chips.

Thus, where a conventional potato slicer and a conventional fryer are already in use, this equipment can be adapted to the process of the present invention by installing at the upstream end of the fryer a sluice to contain the continuous stream of precooking oil, with the sluice being fed directly from the slicer with freshly cut potato slices enveloped in their own natural starches, and the water shower or other washing equipment simply eliminated.

In many instances the conventional fryer will be associated with a heat exchanger which receives oil from the downstream end of the fryer, reheats it to a desired temperature and recirculates the heated oil back to the upstream end of the fryer. This apparatus can also be adapted to the process of the present invention, with only a portion of the oil from the downstream end of the fryer being conveyed to the heat exchanger, while the remaining portion is diverted to the upstream end of the sluice with appropriate control to ensure that the oil introduced into the sluice is in the desired range of temperature for caramelizing the starch envelope on the raw potato slices.

Additionally, it has been found desirable to provide at the upstream end of the sluice a pad of a synthetic fluorine resinous material, such as that sold under the trademark TEFLON, to eliminate sticking of the starch-coated slices to the bottom of the sluice at this point.

Also, the oil level in the sluice, and the degree of precooking in the sluice may be controlled through the use of a variable speed paddle wheel located within the sluice.

These and other features and advantages of the present invention will become more readily apparent from the following detailed description thereof.

BRIEF DESCRIPTION OF THE DRAWINGS

FIG. 1 is a somewhat schematic view showing the equipment utilized in practicing the process of the present invention;

FIG. 2 is a block diagram showing the steps of the process of the present invention;

FIG. 3 is a perspective view of the precooking sluice; and

FIG. 4 is a plan view thereof.

DESCRIPTION OF THE PREFERRED EMBODIMENTS

As seen in FIG. 1, raw, peeled potatoes 10 are fed to a slicer 12, which cuts the potatoes into thin slices 14. The thickness of the slices can be varied somewhat depending upon the characteristics of the final chip desired. For example, conventional potato chips will usually have a thickness of approximately 0.0058 inch to 0.0062 inch, while thicker chips may range up to 0.012 inch in thickness.

Regardless of this the slices 14 are dropped into a sluice 16 adjacent an upstream end 18 thereof. It is possible that the slices may be fed directly from the slicer 12 into the sluice 16, although in most instances it will be desirable to use an open mesh conveyor 20 to allow small pieces of potato and excess liquid to drop off before the slices are fed to the sluice. The sluice contains a moving stream of precooking oil 22, which is fed into the upstream end of the sluice as seen in FIG. 3 of the drawings by means of a manifold 24 having a series of outlets 26.

It will also be noted from FIG. 3 of the drawings that a pad 28 of a non-sticking type material, such as that sold under the trademark TEFLON, is positioned at the upstream end of the sluice to prevent sticking of the raw, starch-coated potato slices to the bottom of a sluice. A flow control paddle wheel 30 is mounted intermediate the ends of the sluice and is rotated by a separate power source 32 in the direction of oil flow to control the depth of the oil upstream of the control paddle wheel and the degree of precooking of the chips in the sluice.

At its downstream end 34 the sluice is provided with a discharge chute 36 which conveys the precooked chips into the fryer 38 and a baffle 40 is positioned above the discharge chute to deflect and direct the precooked chips into the upstream end 42 of the fryer.

The fryer 38 contains a continuous stream of cooking oil 44 and one or more flow control paddles 46, and at its downstream end 48 a conveyor 50 lifts the cooked chips from the fryer and conveys them to subsequent stations for post-cooking operations.

In order to maintain the precooking and cooking oils at their desired temperatures, a heat exchanger of conventional design may be utilized adapted to the apparatus and process of the present invention. Thus, a heat exchanger 52 is shown which receives cooking oil 44 from a conduit 54 at the discharge side of a pump 56. The pump 56, in turn, receives oil from the fryer via a conduit 58. After heating in the heat exchanger 52 the heated oil is conveyed by means of a conduit 60 back to the upstream end 42 of the fryer 38 where it mixes with the relatively cooler oil from the sluice 16.

It will also be seen from FIG. 1 of the drawings that the discharge side of the pump 56 is also in communication with a conduit 62 which feeds oil from the downstream end of the fryer 38 to the upstream end 18 of the sluice 16. By appropriate control of the flow through the above described conduits and heat exchanger, the temperature in the sluice and in the fryer can be maintained within desired ranges.

It will also be apparent that the representation in FIG. 1 is somewhat schematic, and, for example, in practice both the sluice 16 and the fryer 38 will be covered and insulated to reduce heat loss and losses due to evaporation.

Regardless of this, it will be seen with reference to FIGS. 1 and 2 of the drawings that the process in accordance with the present invention consists of feeding potato slices directly from the slicer and without an intermediate washing step into the upstream end of the sluice 22 where a continuous stream of oil is maintained at a temperature of from 200° to 300° F., and preferably in a range of approximately 260° to 290° F. for a period of from ten to twenty seconds, and preferably for twelve to eighteen seconds, where the potato slices are precooked, causing a caramelization of the natural starch which envelopes each of the potato slices and to provide a caramelized envelope which acts as a barrier to oil penetration and retards the rate of moisture escape.

The thus enveloped potato slices are then conveyed to the fryer 38 where they are immersed in a cooking oil having a temperature in the range of 300° to 400° F., and preferably in a range of 305° to 312° F. for a period of from five to ten minutes, and preferably for a period of from five to seven minutes.

The resulting chips will ordinarily have an oil content of approximately 28% to 35% by weight and a moisture content of 1.5% to 2.2% by weight and will exhibit a textured appearance with small air pockets under the surface which impart a lightness, and a crisper crunchier quality to the chip.

While the method herein described, and the form of apparatus for carrying this method into effect constitute preferred embodiments of this invention, it is to be understood that the invention is not limited to this precise method and form of apparatus, and that changes may be made in either without departing from the scope of the invention, which is defined in the appended claims.

What is claimed is:

1. A method of preparing a food product comprising:
    slicing raw potatoes into thin slices enveloped in a natural starch coating released from crushed potato cells during said slicing,
    precooking said starch-enveloped slices in a liquid at a temperature of 200° to 300° for a first relatively short period of time, and
    thereafter cooking the resulting precooked slices in a liquid at a temperature of 300° to 400° for a second period of time substantially longer than said first period of time.

2. The method of claim 1 wherein said precooking takes place at a temperature of 260° to 290° F.

3. The method of claim 1 wherein said cooking takes place at a temperature of 305° to 312° F.

4. The method of claim 3 wherein said precooking takes place at a temperature of 260° to 290° F.

5. The method of claim 1 wherein said precooking is for a period of ten to twenty seconds.

6. The method of claim 5 wherein said precooking is for a period of twelve to eighteen seconds.

7. The method of claim 1 wherein said cooking is for a period of five to ten minutes.

8. The method of claim 7 wherein said cooking is for a period of five to seven minutes.

9. The method of claim 8 wherein said precooking takes place for a period of twelve to eighteen seconds.

10. The method of claim 1 wherein:
said liquid is a vegetable oil, and a portion of said vegetable oil used in said cooking step is recirculated to said precooking step.

11. A method of preparing a food product comprising:
slicing potatoes into slices 0.005 inch to 0.012 inch in thickness to provide thin potato slices enveloped in a natural starch coating resulting from potato cells crushed during said slicing,
precooking said starch enveloped potato slices in a first moving stream of oil having a temperature of 260° to 290° F. for twelve to eighteen seconds, and
thereafter cooking said precooked slices in a second moving stream of oil having a temperature of 305° to 312° F. for five to seven minutes.

12. The method of claim 11 further comprising recirculating a first portion of said oil from a downstream end of said second stream to an upstream end of said first stream.

13. The method of claim 12 further comprising:
recirculating a second portion of said oil from said downstream end of said second stream to a heat exchanger,
raising the temperature of said second portion of said oil in said heat exchanger, and
recirculating said second portion of said oil from said heat exchanger to an upstream end of said second stream.

14. A method of preparing a food product comprising:
slicing potatoes into slices 0.005 inch–0.012 inch in thickness to provide thin slices of potato with surfaces of said slices enveloped in a natural starch coating released from potato cells crushed during said slicing,
immersing said thin, starched-coated potato slices into a first moving stream of oil having a temperature of 260° to 290° F.,
maintaining said slices in said first stream as it moves from an upstream end to a downstream end thereof for a period of twelve to eighteen seconds to caramelize said starch coating and provide a natural, caramelized starch envelope for each of said slices,
transferring said caramelized starch enveloped slices from said first stream to a second moving stream of oil having a temperature of 305° to 312° F.,
maintaining said slices in said second stream as it moves from an upstream end to a downstream end thereof for a period of five to seven minutes to cook said slices into potato chips having a moisture content of 1.5% to 2.2% and an oil content of 28% to 35% by weight,
recirculating a first portion of said oil from said downstream end of said second stream to said upstream end of said first stream,
recirculating a second portion of said oil from said downstream end of said second stream to a heat exchanger,
raising the temperature of said second portion of said oil in said heat exchanger, and
recirculating said second portion of said oil from said heat exchanger to said upstream end of said second stream.

* * * * *